US010760627B2

(12) United States Patent
Ono et al.

(10) Patent No.: US 10,760,627 B2
(45) Date of Patent: Sep. 1, 2020

(54) CLUTCH CONTROL DEVICE

(71) Applicant: HONDA MOTOR CO., LTD., Minato-ku, Tokyo (JP)

(72) Inventors: Junya Ono, Wako (JP); Tatsuya Ryuzaki, Wako (JP); Hiroyuki Kojima, Wako (JP); Yoshiaki Nedachi, Wako (JP); Eisuke Kajihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 15/906,060

(22) Filed: Feb. 27, 2018

(65) Prior Publication Data
US 2018/0274607 A1 Sep. 27, 2018

(30) Foreign Application Priority Data
Mar. 24, 2017 (JP) ................. 2017-058603

(51) Int. Cl.
*F16D 48/06* (2006.01)
*F16D 48/02* (2006.01)

(52) U.S. Cl.
CPC ........... *F16D 48/066* (2013.01); *F16D 48/02* (2013.01); *F16D 2048/0266* (2013.01);
(Continued)

(58) Field of Classification Search
CPC .................. F16D 48/02; F16D 48/066; F16D 2048/0263; F16D 2048/0266;
(Continued)

(56) References Cited

U.S. PATENT DOCUMENTS

2001/0035323 A1 11/2001 Porter
2006/0042907 A1* 3/2006 Ronk .................... F16D 29/005
192/85.59
(Continued)

FOREIGN PATENT DOCUMENTS

DE 102012109206 6/2013
DE 102014001073 7/2015
(Continued)

OTHER PUBLICATIONS

European Search Report for European Patent Application No. 18159450.8 dated Oct. 18, 2018.

*Primary Examiner* — David R Morris
*Assistant Examiner* — Lori Wu
(74) *Attorney, Agent, or Firm* — Amin, Turocy & Watson, LLP

(57) ABSTRACT

This clutch control device includes a clutch device, a clutch actuator, a hydraulic pressure circuit device, hydraulic pressure sensors, a control device, and a control valve for controlling a flow of a working fluid between the clutch device and the clutch actuator. The hydraulic pressure sensors include an upstream side hydraulic pressure sensor and a downstream side hydraulic pressure sensor. The control device is configured to perform feedback control of the clutch actuator using hydraulic pressure detection information of a side on which hydraulic pressure fluctuation is small, among the hydraulic pressure detection information of each of the upstream side hydraulic pressure sensor and the downstream side hydraulic pressure sensor, in the case of driving the clutch actuator toward a pressurization side and in the case of driving the clutch actuator to a decompression side.

8 Claims, 11 Drawing Sheets

(52) U.S. Cl.
CPC ........... *F16D 2048/0269* (2013.01); *F16D 2500/104* (2013.01); *F16D 2500/1117* (2013.01); *F16D 2500/3024* (2013.01); *F16D 2500/70406* (2013.01); *F16D 2500/70626* (2013.01)

(58) Field of Classification Search
CPC ........... F16D 2048/0269; F16D 25/14; F16D 2500/104; F16D 2500/1117; F16D 2500/3024; F16D 2500/70406; F16D 2500/7041; F16D 2500/70626
See application file for complete search history.

(56) References Cited

U.S. PATENT DOCUMENTS

| | | |
|---|---|---|
| 2006/0108868 A1* | 5/2006 | Ohsaki ............... B60T 7/122 303/154 |
| 2006/0278492 A1 | 12/2006 | Ronk et al. |
| 2014/0318641 A1 | 10/2014 | Gentile et al. |
| 2016/0341265 A1 | 11/2016 | Heubner |
| 2016/0369854 A1 | 12/2016 | Ono et al. |

FOREIGN PATENT DOCUMENTS

| | | |
|---|---|---|
| DE | 102014221038 | 4/2016 |
| JP | 2011-075041 | 4/2011 |

\* cited by examiner

CLUTCH CONTROL DEVICE

CROSS-REFERENCE TO RELATED APPLICATION

The present application claims priority based on Japanese Patent Application No. 2017-058603 filed Mar. 24, 2017, the content of which is incorporated herein by reference.

BACKGROUND OF THE INVENTION

Field of the Invention

The present invention relates to a clutch control device.

Description of Related Art

Conventionally, a clutch control device that connects and disconnects a clutch device with hydraulic pressure generated by a clutch actuator is known. In Japanese Unexamined Patent Application, First Publication No. 2011-75041, a hydraulic pressure generating device including a clutch actuator, and a hydraulic pressure control device including a control valve and a hydraulic pressure sensor are provided separately from each other. The hydraulic pressure generating device and the hydraulic pressure control device communicate with each other through a first hydraulic pressure hose, and the hydraulic pressure control device and the clutch device communicate with each other through a second hydraulic pressure hose. In the hydraulic pressure control device, a hydraulic pressure sensor detects a clutch line hydraulic pressure in an oil path through which the clutch actuator and the clutch device communicate with each other including each hydraulic pressure hose. The detected value of the hydraulic pressure sensor is used for fail detection in which an abnormality is detected during supply of hydraulic pressure.

SUMMARY OF THE INVENTION

Incidentally, in the clutch control device that generates the clutch control hydraulic pressure with the clutch actuator, when hydraulic pressure detection information from the hydraulic pressure sensor is used, it is possible to control the pressurization and depressurization of the hydraulic pressure in accordance with the change of the hydraulic pressure, that is, to perform feedback control of the clutch actuator. In this case, the control time for the target hydraulic pressure can be further shortened and the control accuracy can be secured.

On the other hand, it is also conceivable to provide a configuration in which hydraulic pressure is enclosed on a downstream side (a clutch device side) of the control valve to reduce the frequency of use of the clutch actuator, by providing a control valve in a hydraulic pressure supply and discharge oil path for supplying and discharging the hydraulic pressure between the clutch actuator and the clutch device, and by closing the control valve as necessary. In this case, when the hydraulic pressure is supplied and discharged between the clutch actuator and the clutch device, a pressure difference occurs between the upstream side (the clutch actuator side) of the control valve and the downstream side of the control valve, due to a pressure loss in the hydraulic pressure circuit device (in particular, the pressure loss when passing through the control valve). Therefore, in order to quickly perform the feedback control of the clutch actuator, it is necessary to sufficiently consider the hydraulic pressure information used for this control, that is, the detection position or the like of the hydraulic pressure sensor in the hydraulic pressure circuit device.

Therefore, an aspect of the present invention is to reduce the time for feedback control of the clutch actuator in a clutch control device that generates a clutch control hydraulic pressure by the clutch actuator.

In order to achieve the above object, a clutch control device according to an aspect of the present invention adopts the following configuration.

(1) An aspect of the present invention relates to a clutch control device including: a clutch device which is configured to connect and disconnect power transmission using hydraulic pressure; a clutch actuator which is configured to generate hydraulic pressure supplied to the clutch device; a hydraulic pressure circuit device which is configured to connect the clutch device and the clutch actuator; a hydraulic pressure sensor which is configured to detect a hydraulic pressure in the hydraulic pressure circuit device; and a control device which is configured to control the clutch actuator in accordance with the hydraulic pressure in the hydraulic pressure circuit device, wherein a control valve is provided in a hydraulic pressure supply and discharge oil path between the clutch device and the clutch actuator in the hydraulic pressure circuit device, and is configured to control a flow of a working fluid between the clutch device and the clutch actuator by closing or opening the hydraulic pressure supply and discharge oil path. The hydraulic pressure sensor includes an upstream side hydraulic pressure sensor and a downstream side hydraulic pressure sensor provided upstream and downstream of the control valve, respectively. The control device is configured to perform feedback control of the clutch actuator using hydraulic pressure detection information of a side on which hydraulic pressure fluctuation is small, among the hydraulic pressure detection information of each of the upstream side hydraulic pressure sensor and the downstream side hydraulic pressure sensor, in the case of driving the clutch actuator toward a pressurization side and in the case of driving the clutch actuator to a decompression side.

According to the aspect of (1), even if a difference occurs in hydraulic pressure behavior between the upstream side (the clutch actuator side) of the control valve and the downstream side (the clutch device side) of the control valve, in consideration of the difference in the hydraulic pressure behavior, by utilizing the hydraulic pressure detection information of the side on which the fluctuation of the hydraulic pressure is smaller, among the hydraulic pressure detection information of each of the upstream side hydraulic pressure sensor and the downstream side hydraulic pressure sensor, shortening of the time taken until completion of the feedback control is promoted, and quick hydraulic pressure clutch control can be performed.

That is, when the hydraulic pressure is supplied and discharged between the clutch actuator and the clutch device, due to the pressure loss in the hydraulic pressure circuit device (particularly, the pressure loss when passing through the control valve), the pressure difference occurs between the clutch actuator side and the clutch device side. For this reason, the difference occurs in the hydraulic pressure behavior between the upstream side of the control valve and the downstream side of the control valve at the pressurization control time for supplying the hydraulic pressure from the clutch actuator to the clutch device and at the depressurization control time for returning the hydraulic pressure from the clutch device to the clutch actuator. However, even in this case, it is possible to shorten the time taken until completion of the feedback control and to perform the quick hydraulic pressure clutch control.

(2) In the aspect of (1), the control device may be configured to perform the feedback control of the clutch actuator using the hydraulic pressure detection information of the downstream side hydraulic pressure sensor in the case of driving the clutch actuator to the pressurization side, and the control device may be configured to perform the feedback control of the clutch actuator using the hydraulic pressure detection information of the upstream side hydraulic pressure sensor in the case of driving the clutch actuator to the decompression side.

According to the aspect of (2), when the clutch actuator is driven to the pressurization side, the feedback control is performed on the basis of the detection information of the downstream side hydraulic pressure sensor. When the clutch actuator is driven to the depressurization side, the feedback control is performed on the basis of the detection information of the upstream side hydraulic pressure sensor. As a result, even when a difference occurs in hydraulic pressure behavior between the upstream side and the downstream side of the control valve, due to the influence of resistance when the working fluid flows through the control valve at the time of pressurization and depressurization, it is possible to control the clutch actuator using the hydraulic pressure detection information of the side on which the hydraulic pressure fluctuation is smaller. For this reason, it is possible to shorten the time taken until completion of the feedback control.

(3) In the aspect of (2), the control device may be configured to perform the feedback control of the clutch actuator using hydraulic pressure detection information on a side with a low detection value, among hydraulic pressure detection information of each of the upstream side hydraulic pressure sensor and the downstream side hydraulic pressure sensor.

According to the aspect of (3), when the hydraulic pressure detection value used for the feedback control of the clutch actuator is switched, the hydraulic pressure detection information on the side with low detection value in both hydraulic pressure sensors is selected. At the time of pressurization and depressurization, the side on which the hydraulic pressure detection value decreases under the influence of the resistance of the control valve is a side on which the fluctuation in the hydraulic pressure is small. By utilizing this characteristic, it is possible to shorten the time taken until the completion of the feedback control, while performing simple control of selecting the hydraulic pressure information on the side with a lower detected value, among the hydraulic pressure detection information of both of the hydraulic pressure sensors.

(4) In the aspect of (1), a single type of sensor may be used as both of the upstream side hydraulic pressure sensor and the downstream side hydraulic pressure sensor.

According to the aspect of (4), since both hydraulic pressure sensors are configured using a single type of sensor, the characteristics of the output values of both of the hydraulic pressure sensors are set to be the same. Therefore, it is unnecessary to convert the output of both of the hydraulic pressure sensors, and it is possible to suppress an increase in the load of control calculation.

(5) In the aspect of (1), the upstream side hydraulic pressure sensor and the downstream side hydraulic pressure sensor may be attached to a hydraulic pressure circuit component member of the hydraulic pressure circuit device.

According to the aspect of (5), by attaching the plurality of hydraulic pressure sensors to the hydraulic pressure circuit component member of the hydraulic pressure circuit device together with the control valve to integrally form a unit, both of the hydraulic pressure sensors can be disposed close to the control valve. Therefore, it is possible to equalize the hydraulic pressure detection conditions (the distance to the control valve or the like) of both hydraulic pressure sensors, and to reduce the difference in detection accuracy.

(6) In the aspect of (5), the upstream side hydraulic pressure sensor and the downstream side hydraulic pressure sensor may be axially aligned in a same direction and may be attached to the hydraulic pressure circuit component member from a same side in the axial direction.

According to the aspect of (6), the axial directions of both hydraulic pressure sensors are made to coincide with each other in the same direction, and it is possible for both hydraulic pressure sensors to be disposed with the direction in which they are attached to the hydraulic pressure circuit component member aligned in the axial direction. Therefore, the plurality of hydraulic pressure sensors are compactly disposed, attachment and detachment of the plurality of hydraulic pressure sensors are facilitated, and it is possible to easily facilitate the handling of a harness connected to the plurality of hydraulic pressure sensors.

(7) In the aspect of (5), the hydraulic pressure circuit component member may have a valve chamber of the control valve, an upstream side sensing chamber and a downstream side sensing chamber which face sensing units of the upstream side hydraulic pressure sensor and the downstream side hydraulic pressure sensor, respectively, and an oil path through which the valve chamber, the upstream side sensing chamber, and the downstream side sensing chamber communicate with each other.

According to the aspect of (7), since the oil paths through which the valve chamber of the control valve and the respective sensing chambers of both hydraulic pressure sensors communicate are formed in the hydraulic pressure circuit component member, it is possible to easily integrate the hydraulic pressure circuit device including the control valve and both hydraulic pressure sensors.

(8) In the aspect of (5), the clutch actuator may have a master cylinder as a hydraulic pressure generating device, and a cylinder main body of the master cylinder may be integrated with the hydraulic pressure circuit component member.

According to the aspect of (8), by integrally forming the cylinder main body of the master cylinder of the clutch actuator with the hydraulic pressure circuit component member, it is possible to easily configure the integrated clutch control unit which includes the control valve, both hydraulic pressure sensors, and the master cylinder.

According to the aspect of the present invention, in the clutch control device that generates the clutch control hydraulic pressure by the clutch actuator, it is possible to shorten the time for feedback control of the clutch actuator.

DESCRIPTION OF EMBODIMENTS

Figure 1:
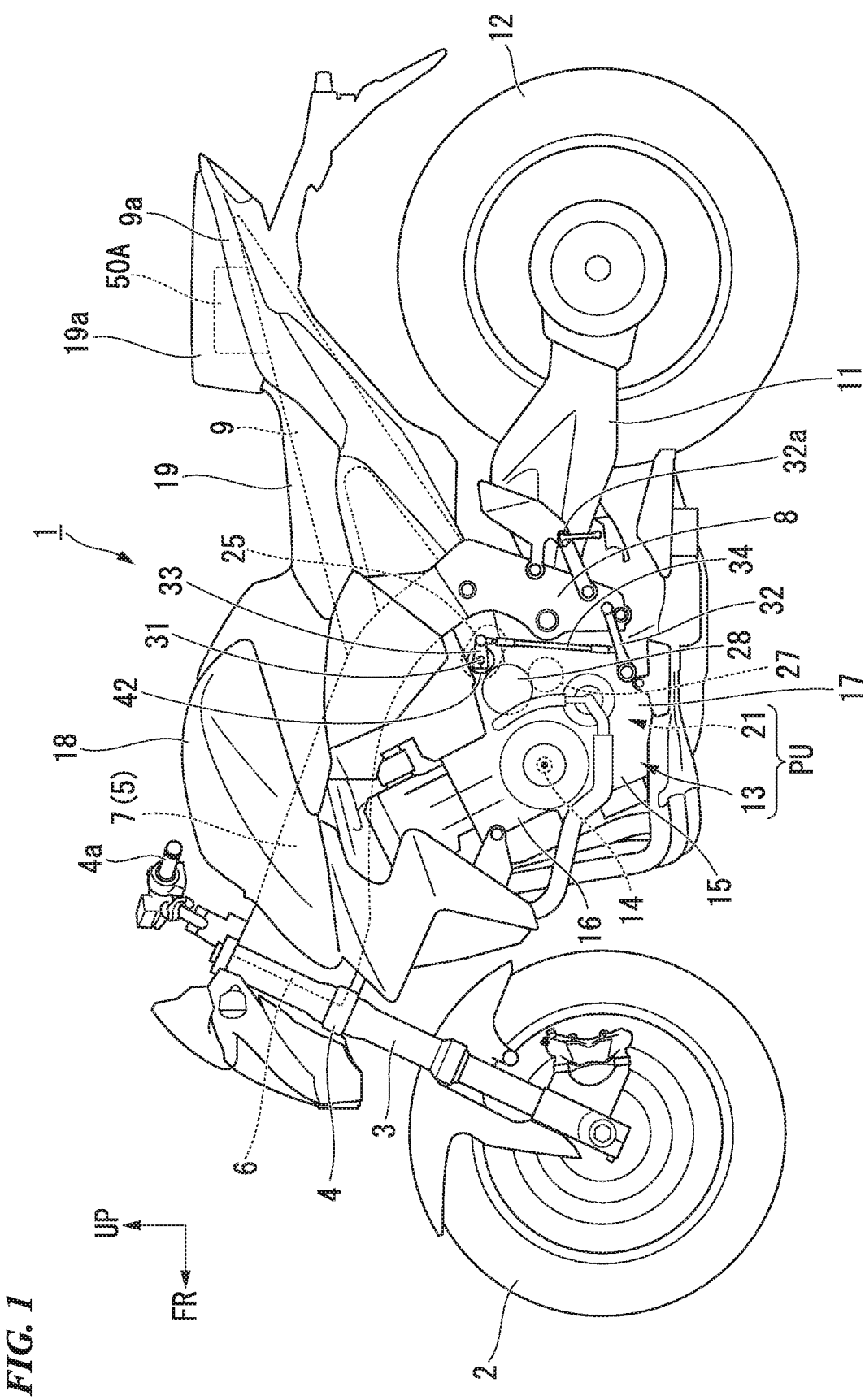
FIG. 1 is a left side view of a motorcycle according to an embodiment of the present invention.

Hereinafter, embodiments of the present invention will be described with reference to the accompanying drawings. Further, directions of forward, rearward, leftward, rightward, and so on, to be described below are the same as directions of a vehicle to be described below unless the context clearly indicates otherwise. In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

As shown in FIG. 1, an embodiment is applied to a motorcycle 1, which is a saddle riding vehicle. A front wheel 2 of the motorcycle 1 is supported by lower end portions of a pair of left and right front forks 3. Upper sections of the left and right front forks 3 are supported by a head pipe 6 of a front end portion of a vehicle body frame 5 via a steering stem 4. A bar type steering handle 4a is attached to a top bridge of the steering stem 4.

The vehicle body frame 5 includes the head pipe 6, main tubes 7 extending from the head pipe 6 toward a lower rear side at a center in vehicle width direction (a leftward/rightward direction), left and right pivot frames 8 continuous with lower sides of rear end portions of the main tubes 7, and a seat frame 9 continuous with rear sides of the main tubes 7 and the left and right pivot frames 8. Front end portions of swing arms 11 are swingably pivoted in the left and right pivot frames 8. A rear wheel 12 of the motorcycle 1 is supported by the rear end portions of the swing arms 11.

A fuel tank 18 is supported over the left and right main tubes 7. A front seat 19 and a rear seat cover 19a are supported over the seat frame 9 behind the fuel tank 18 to be arranged in a forward/rearward direction. Surroundings of the seat frame 9 are covered by a rear cowl 9a. A power unit PU serving as a prime mover of the motorcycle 1 is hung from lower sides of the left and right main tubes 7. The power unit PU is linked to the rear wheel 12 via, for example, a chain type transmission mechanism.

The power unit PU integrally has an engine 13 disposed at a front side thereof and a gearbox 21 disposed at a rear side thereof. The engine 13 is, for example, a multiple cylinder engine having a rotary shaft of a crankshaft 14 in a leftward/rightward direction (a vehicle width direction). The engine 13 has a cylinder 16 standing up above a front section of a crank case 15. A rear section of the crank case 15 is a gearbox case 17 configured to accommodate the gearbox 21.

Figure 2:
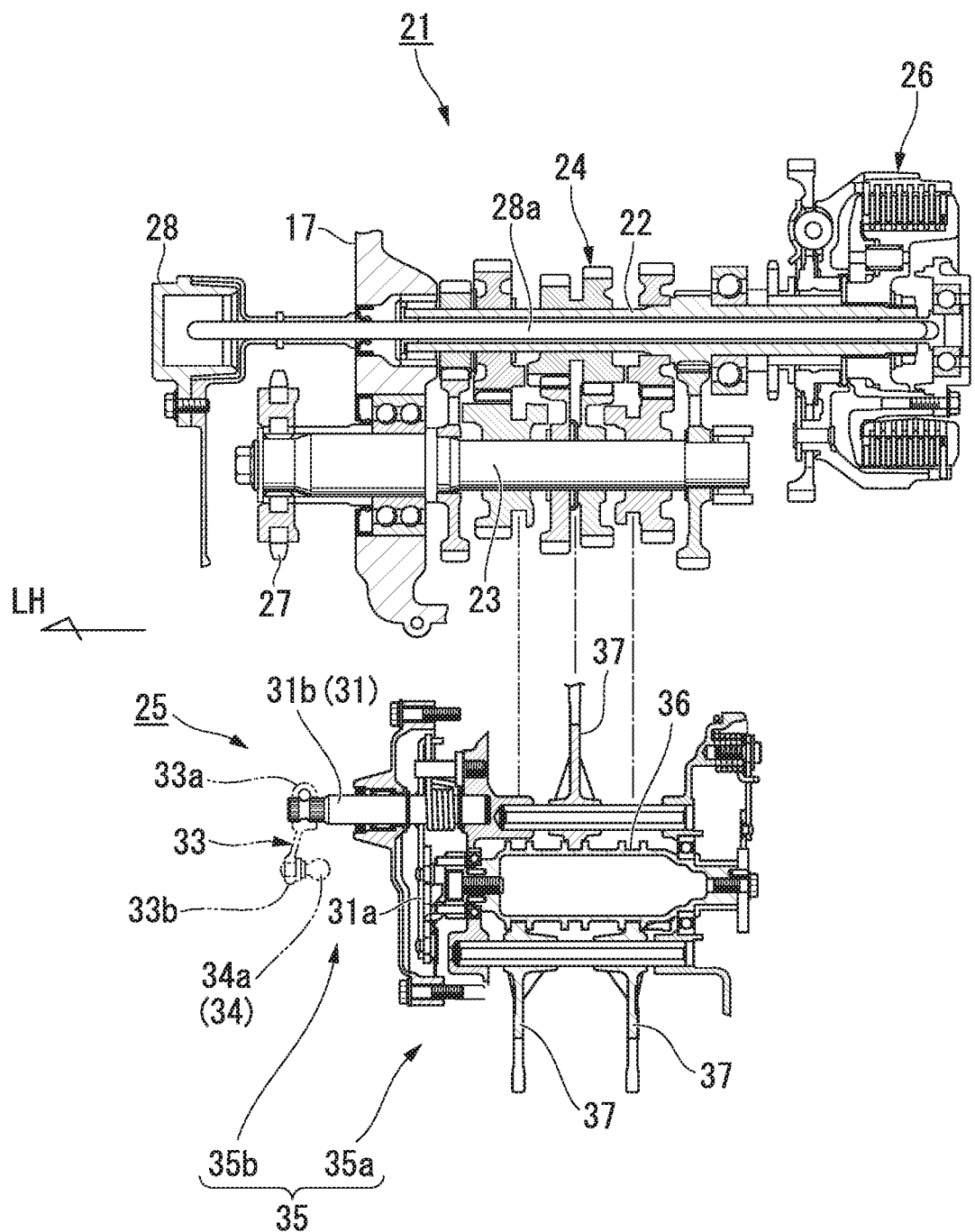
FIG. 2 is a cross-sectional view of a gearbox and a change mechanism of the motorcycle.

As shown in FIG. 2, the gearbox 21 is a stepped transmission having a main shaft 22 and a counter shaft 23, and a shifting gear group 24 that bridges both of the shafts 22 and 23. The counter shaft 23 constitutes an output shaft of the gearbox 21, and consequently, the power unit PU. An end portion of the counter shaft 23 protrudes toward a left side of a rear section of the crank case 15 and is connected to the rear wheel 12 via the chain type transmission mechanism.

The shifting gear group 24 has gears corresponding to the number of shifting stages each supported by both of the shafts 22 and 23. The gearbox 21 is a constant mesh type in which the corresponding gear pairs of the shifting gear group 24 always mesh with each other between both of the shafts 22 and 23. The plurality of gears supported by both of the shafts 22 and 23 are classified into a free gear rotatable with respect to the corresponding shaft and a slide gear (shifter) spline-fitted to the corresponding shaft. An axially convex dog is provided in one of the free gear and the slide gear, and an axially concave slot engaging the dog is provided in the other thereof. That is, the gearbox 21 is a so-called dog mission.

Figure 3:
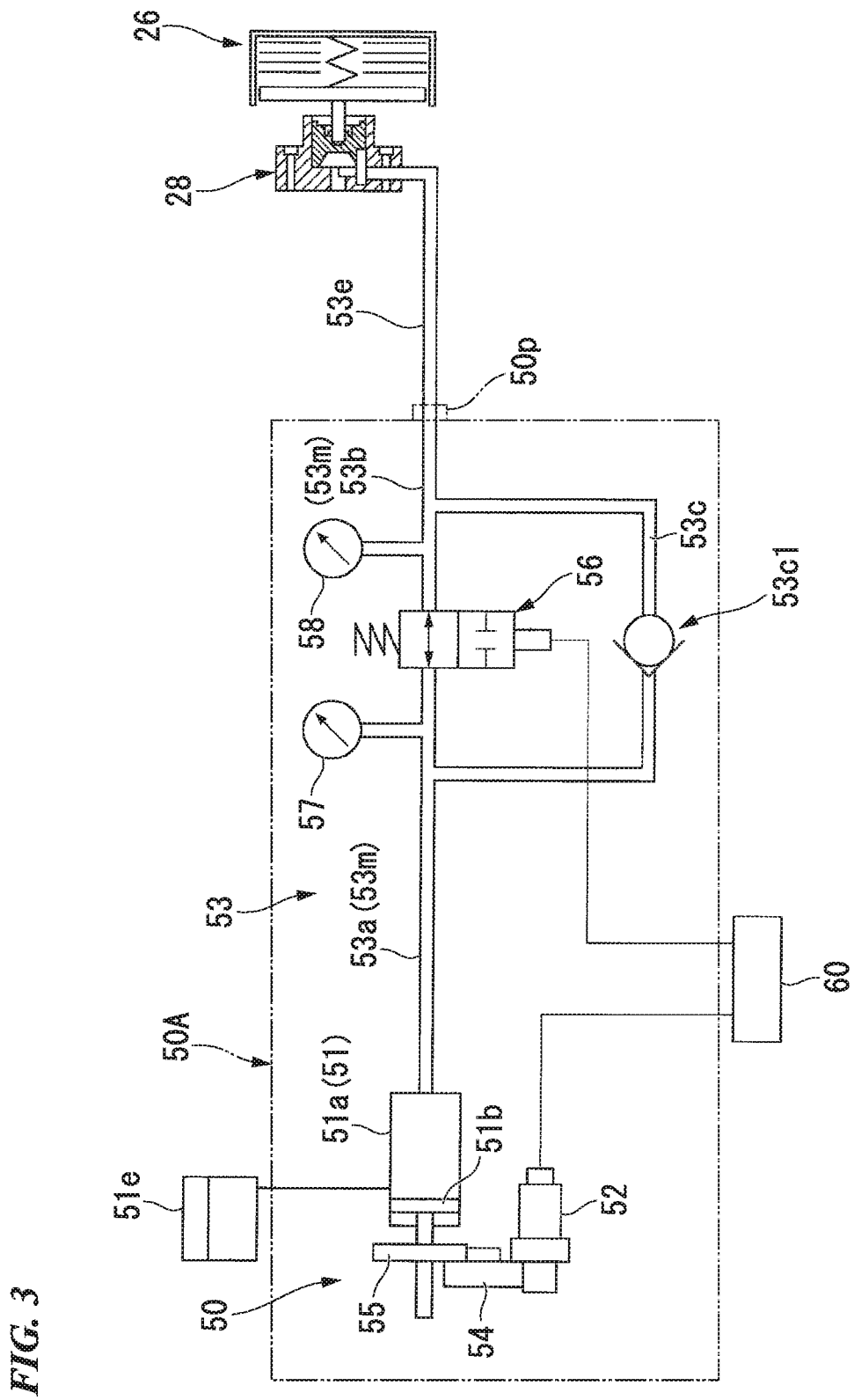
FIG. 3 is a view for schematically describing a clutch operation system including a clutch actuator.

Referring also to FIG. 3, the main shaft 22 and the counter shaft 23 of the gearbox 21 are disposed behind the crankshaft 14 to be arranged in the forward/rearward direction. A clutch device 26 operated by a clutch actuator 50 is disposed coaxially with a right end portion of the main shaft 22. The clutch device 26 is, for example, a multi-plate wet clutch, which is a so-called normal open clutch. That is, the clutch device 26 is in a connected state in which power transmission is made possible by supply of a hydraulic pressure from the clutch actuator 50, and returns to a cut state in which power transmission is impossible when no hydraulic pressure from the clutch actuator 50 is supplied.

Referring to FIG. 2, rotary power of the crankshaft 14 is transmitted to the main shaft 22 via the clutch device 26 and transmitted to the counter shaft 23 from the main shaft 22 via an arbitrary gear pair of the shifting gear group 24. A drive sprocket 27 of the chain type transmission mechanism is attached to a left end portion of the counter shaft 23 protruding toward a left side of a rear section of the crank case 15.

A change mechanism 25 configured to change a gear pair of the shifting gear group 24 is accommodated in the gearbox 21 on a rear upper side thereof. The change mechanism 25 operates a plurality of shift forks 37 according to a pattern of a lead groove formed on an outer circumference thereof due to rotation of a hollow cylindrical shift drum 36 parallel to both of the shafts 22 and 23, and changes a gear pair using power transmission between the shafts 22 and 23 in the shifting gear group 24.

The change mechanism 25 has a shift spindle 31 parallel to the shift drum 36. During pivotal movement of the shift spindle 31, a shift arm 31a fixed to the shift spindle 31 rotates the shift drum 36, moves the shift forks 37 in the axial direction according to a pattern of the lead groove, and changes a gear pair that enables power transmission in the shifting gear group 24 (i.e., changes a shifting stage).

The shift spindle 31 causes an outer shaft section 31b to protrude outward (toward a left side) from the crank case 15 in the vehicle width direction so that the change mechanism 25 can be operated. A shift load sensor 42 (a shift operation detection unit) is attached coaxially to the outer shaft section 31b of the shift spindle 31 (see FIG. 1). A swing lever 33 is attached to the outer shaft section 31b of the shift spindle 31 (or a pivot shaft of the shift load sensor 42). The swing lever 33 extends rearward from a base end portion 33a fixed to the shift spindle 31 (or the pivot shaft) by a clamp, and an upper end portion of a link rod 34 is swingably connected to a tip portion 33b thereof via an upper ball joint 34a. A lower end portion of the link rod 34 is swingably connected to a shift pedal 32 operated by a driver's foot via a lower ball joint (not shown).

As shown in FIG. 1, a front end portion of the shift pedal 32 is vertically swingably supported by a lower section of the crank case 15 via a shaft in the leftward/rightward direction. A pedal section on which a driver's foot placed on a step 32a is put is formed on a rear end portion of the shift pedal 32, and a lower end portion of the link rod 34 is connected to an intermediate section of the shift pedal 32 in the forward/rearward direction.

As shown in FIG. 2, a shift change apparatus 35 including the shift pedal 32, the link rod 34 and the change mechanism 25 and configured to change a shifting stage gear of the gearbox 21 is provided. In the shift change apparatus 35, an assembly (the shift drum 36, the shift forks 37, and so on) configured to change a shifting stage of the gearbox 21 in the gearbox case 17 is referred to as a shift operation section 35a, and an assembly (the shift spindle 31, the shift arm 31a, and so on) configured to pivot the shift spindle 31 into which a shift operation to the shift pedal 32 is input around the axis thereof and transmit the pivotal movement to the shift operation section 35a is referred to as a shifting operation receiving section 35b.

Here, the motorcycle 1 employs a so-called semi-automatic gear shift system in which only a shifting operation of the gearbox 21 (a foot operation of the shift pedal 32) is performed by a driver, and a cutting and connecting operation of the clutch device 26 is automatically performed by electric control according to an operation of the shift pedal 32.

Figure 4:
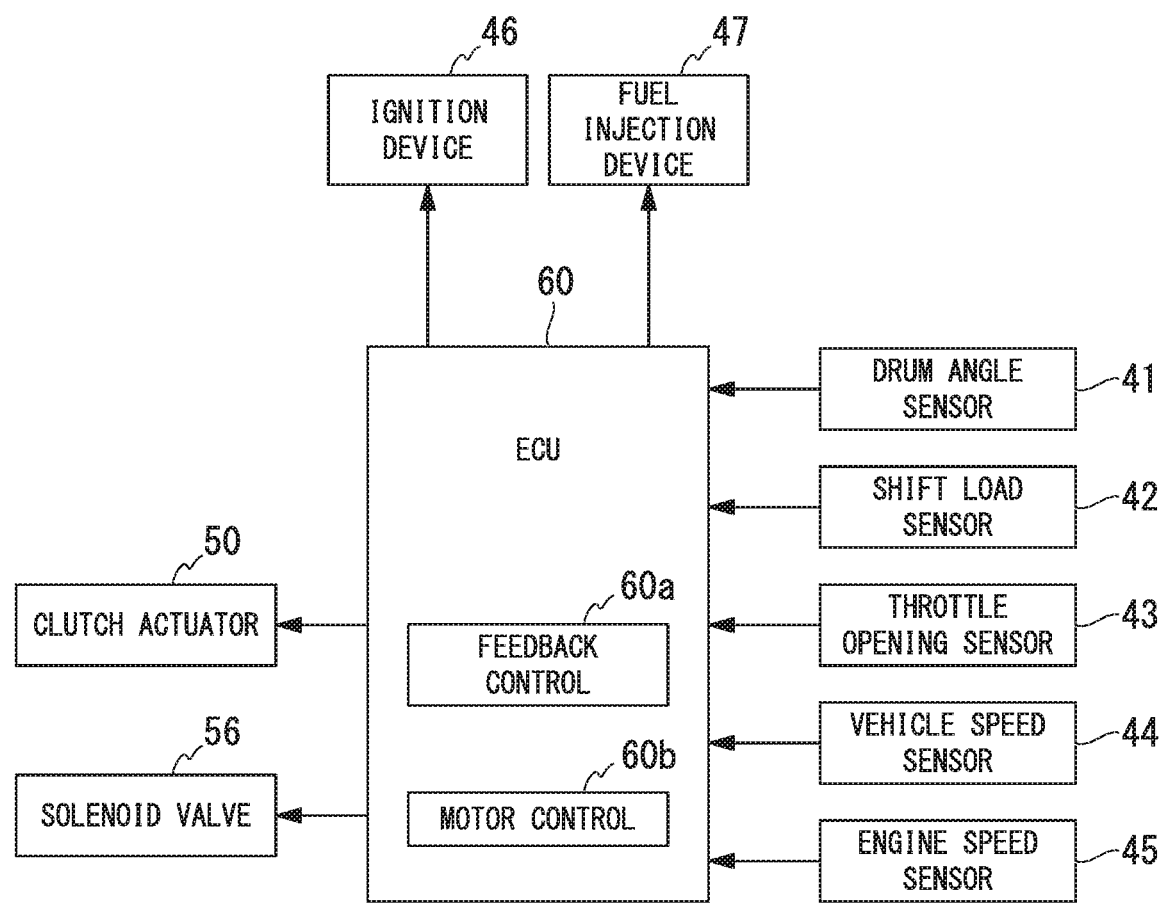
FIG. 4 is a block diagram of a gear shift system.

As shown in FIG. 4, the gear shift system includes the clutch actuator 50, a solenoid valve (a control valve) 56, an electronic control unit (ECU, a control device) 60 and various sensors 41 to 45.

The ECU 60 controls operations of an ignition device 46 and a fuel injection device 47 while controlling an operation of the clutch actuator 50 on the basis of detection information from a drum angle sensor (a gear position sensor) 41 configured to detect a shifting unit from a pivot angle of the shift drum 36 and a shift load sensor (a torque sensor) 42 configured to detect an operating torque input into the shift spindle 31 and detection information of various vehicle states from a throttle opening sensor 43, a vehicle speed sensor 44, an engine speed sensor 45, and so on. Detection information from hydraulic pressure sensors 57 and 58 which will be described below is also input into the ECU 60.

Referring also to FIG. 3, the clutch actuator 50 can control a liquid pressure that cuts and connects the clutch device 26 as the clutch actuator 50 is operationally controlled by the ECU 60. The clutch actuator 50 includes an electric motor 52 serving as a drive source (hereinafter, simply referred to as a motor 52), and a master cylinder 51 driven by the motor 52. The clutch actuator 50 constitutes an integrated clutch control unit 50A, together with a hydraulic pressure circuit device 53 provided between the master cylinder 51 and the hydraulic pressure supply and discharge port 50p.

The master cylinder 51 strokes a piston 51b in a cylinder main body 51a by driving the motor 52, and can supply and discharge a working fluid in the cylinder main body 51a into/from a slave cylinder 28. Reference numeral 51e in the drawing designates a reservoir connected to the master cylinder 51.

The hydraulic pressure circuit device 53 has a valve mechanism (a solenoid valve 56) configured to open or block an intermediate area of a main oil path (hydraulic pressure supply and discharge oil path) 53m extending from the master cylinder 51 toward the clutch device 26 (the slave cylinder 28). The main oil path 53m of the hydraulic pressure circuit device 53 is divided into an upstream side oil path 53a closer to the master cylinder 51 than the solenoid valve 56, and a downstream side oil path 53b closer to the slave cylinder 28 than the solenoid valve 56. The hydraulic pressure circuit device 53 further includes a bypass oil path 53c that bypasses the solenoid valve 56 and brings the upstream side oil path 53a and the downstream side oil path 53b in communication with each other.

The solenoid valve 56 is a so-called normal open valve. A one way valve 53c1 configured to cause a working fluid to flow in only one direction from an upstream side toward a downstream side is installed in the bypass oil path 53c. An upstream side hydraulic pressure sensor 57 configured to detect a hydraulic pressure of the upstream side oil path 53a is installed upstream from the solenoid valve 56. A downstream side hydraulic pressure sensor 58 configured to detect a hydraulic pressure of the downstream side oil path 53b is installed downstream from the solenoid valve 56.

As shown in FIG. 1, the clutch control unit 50A is accommodated in, for example, the rear cowl 9a. The slave cylinder 28 is attached to a rear section of the crank case 15 on the left side. The clutch control unit 50A and the slave cylinder 28 are connected to each other via a hydraulic pressure pipeline 53e (see FIG. 3).

As shown in FIG. 2, the slave cylinder 28 is disposed coaxially with the main shaft 22 on the left side. The slave cylinder 28 presses a push rod 28a passing through the main shaft 22 rightward when a hydraulic pressure from the clutch actuator 50 is supplied. The slave cylinder 28 actuates the clutch device 26 to a connected state via the push rod 28a by pressing the push rod 28a rightward. The slave cylinder 28 releases the pressing against the push rod 28a and returns the clutch device 26 to a disconnected state when no hydraulic pressure is supplied.

While a hydraulic pressure should be continuously supplied to maintain the clutch device 26 in the connected state, electric power is consumed to that extent. Here, as shown in FIG. 3, the solenoid valve 56 is installed in the hydraulic pressure circuit device 53 of the clutch control unit 50A, and the solenoid valve 56 is closed after supply of the hydraulic pressure toward the clutch device 26. Accordingly, a configuration for maintaining the hydraulic pressure supplied toward the clutch device 26 and supplementing a hydraulic pressure to an extent of a decrease in pressure (recharging the hydraulic pressure to an extent of leakage) is provided, and energy consumption is suppressed.

Figure 5:
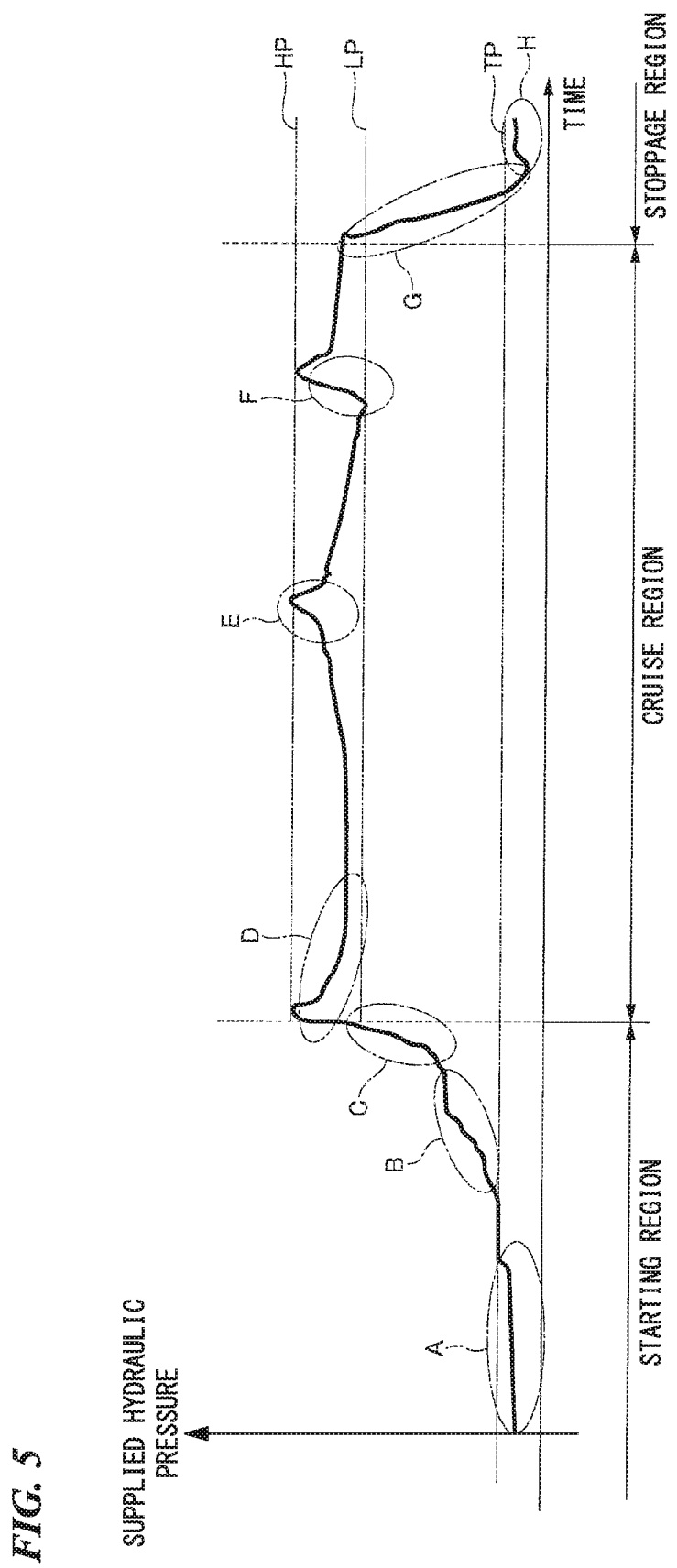
FIG. 5 is a graph showing a variation of a supplied hydraulic pressure in the clutch actuator.

Next, an action of the clutch control system will be described with reference to a graph of FIG. 5. In the graph of FIG. 5, a vertical axis represents a supplied hydraulic pressure detected by the downstream side hydraulic pressure sensor 58, and a horizontal axis represents the passage of time.

During stoppage (idling) of the motorcycle 1, the motor 52 and the solenoid valve 56 controlled by the ECU 60 are in a state in which supply of electric power is disconnected. That is, the motor 52 is in a stopped state and the solenoid valve 56 is in an open state. Here, the slave cylinder 28 side (a downstream side) is in a low pressure state with pressure lower than a touch point hydraulic pressure TP, and the clutch device 26 is in a disengaged state (a disconnected state, a released state). The state corresponds to a region A of FIG. 5.

During starting of the motorcycle 1, when a rotation number of the engine 13 is increased, electric power is supplied to the motor 52 only, a hydraulic pressure is supplied from the master cylinder 51 to the slave cylinder 28 via the solenoid valve 56 in the open state. When the hydraulic pressure on the side of the slave cylinder 28 (a downstream side) is increased to be higher than the touch point hydraulic pressure TP, engagement of the clutch device 26 is started, and the clutch device 26 is in a half clutch state in which some power can be transmitted. Accordingly, smooth starting of the motorcycle 1 becomes possible. This state corresponds to a region B of FIG. 5.

Then, when the difference between the input rotation and the output rotation of the clutch device 26 is reduced and a hydraulic pressure on the side of the slave cylinder 28 (the downstream side) reaches a lower limit holding hydraulic pressure LP, the engagement of the clutch device 26 is shifted to the locked state, and a driving force of the engine 13 is entirely transmitted to the gearbox 21. This state corresponds to a region C of FIG. 5. The regions A to C are set as a starting region.

When hydraulic pressure is supplied from the master cylinder 51 side to the slave cylinder 28 side, the solenoid valve 56 is set to the open state, and the motor 52 is energized and driven forward to press the master cylinder 51. As a result, the hydraulic pressure on the side of the slave cylinder 28 is regulated to the clutch engagement hydraulic pressure. At this time, driving of the clutch actuator 50 is feedback-controlled on the basis of the detected hydraulic pressure of the downstream side hydraulic pressure sensor 58.

Then, when the hydraulic pressure on the side of the slave cylinder 28 (the downstream side) reaches an upper limit holding hydraulic pressure HP, supply of electric power to the motor 52 is stopped and generation of a hydraulic pressure is stopped while electric power is supplied to the solenoid valve 56 and the solenoid valve 56 is closed. That is, while the upstream side is in a low pressure state as the hydraulic pressure is released, the downstream side is maintained in a high pressure state (the upper limit holding hydraulic pressure HP). Accordingly, the clutch device 26 can be maintained in an engaged state without generation of a hydraulic pressure by the master cylinder 51, and electric power consumption can be suppressed while traveling of the motorcycle 1 is possible.

Here, depending on the gear shifting operation, there may be a case in which the gear shifting is performed immediately after the hydraulic pressure is filled to the clutch device 26. In this case, before the solenoid valve 56 is closed and the upstream side is brought into the low-pressure state, the motor 52 is driven in the reverse direction while the solenoid valve 56 remains in the valve open state, the pressure of the master cylinder 51 is reduced, the reservoir 51e is caused to communicate, and the hydraulic pressure on the clutch device 26 is released to the master cylinder 51 side. At this time, driving of the clutch actuator 50 is feedback-controlled on the basis of the detected hydraulic pressure of the upstream side hydraulic pressure sensor 57.

Even in a state in which the solenoid valve 56 is closed, and the clutch device 26 is maintained in the engaged state, as shown in a region D of FIG. 5, a hydraulic pressure on the downstream side is gradually decreased (leaks). That is, the hydraulic pressure on the downstream side gradually decreases, due to factors such as hydraulic pressure leakage or temperature drop caused by deformation of tools such as the solenoid valve 56 and seal of the one way valve 53c1.

On the other hand, as in the region E of FIG. 5, there is also a case in which the hydraulic pressure on the downstream side rises due to a temperature rise or the like. If there is a fine hydraulic pressure fluctuation on the downstream side, it can be absorbed by an accumulator 59, and the electric power consumption is not increased by operating the motor 52 and the solenoid valve 56 each time the hydraulic pressure fluctuates.

As in the region E of FIG. 5, when the hydraulic pressure on the downstream side rises to the upper limit holding hydraulic pressure HP, the solenoid valve 56 is gradually opened to relieve the hydraulic pressure on the downstream side to the upstream side, by lowering the power supply to the solenoid valve 56 or the like.

As shown in a region F of FIG. 5, when the hydraulic pressure on the downstream side is decreased to the lower limit holding hydraulic pressure LP, supply of electric power to the motor 52 is started while the solenoid valve 56 is closed, and the hydraulic pressure on the upstream side is increased. When the hydraulic pressure on the upstream side is higher than the hydraulic pressure on the downstream side, the hydraulic pressure is supplemented (recharged) to the downstream side via the bypass oil path 53c and the one way valve 53c1. When the hydraulic pressure on the downstream side reaches the upper limit holding hydraulic pressure HP, supply of electric power to the motor 52 is stopped and generation of a hydraulic pressure is stopped. Accordingly, the hydraulic pressure on the downstream side is maintained between the upper limit holding hydraulic pressure HP and the lower limit holding hydraulic pressure LP, and the clutch device 26 is maintained in an engaged state. The regions D to F are set as a cruise region.

During stoppage of the motorcycle 1, supply of electric power to the motor 52 and the solenoid valve 56 is also stopped. Accordingly, the master cylinder 51 stops generation of a hydraulic pressure and stops supply of a hydraulic pressure to the slave cylinder 28. The solenoid valve 56 is in an open state, and a hydraulic pressure in the downstream side oil path 53b is returned to the reservoir 51e. Accordingly, the slave cylinder 28 side (the downstream side) is in a low pressure state with pressure lower than the touch point hydraulic pressure TP, and the clutch device 26 is in a disengaged state. This state corresponds to regions G and H of FIG. 5. The regions G and H are set as a stoppage region.

Figure 6:
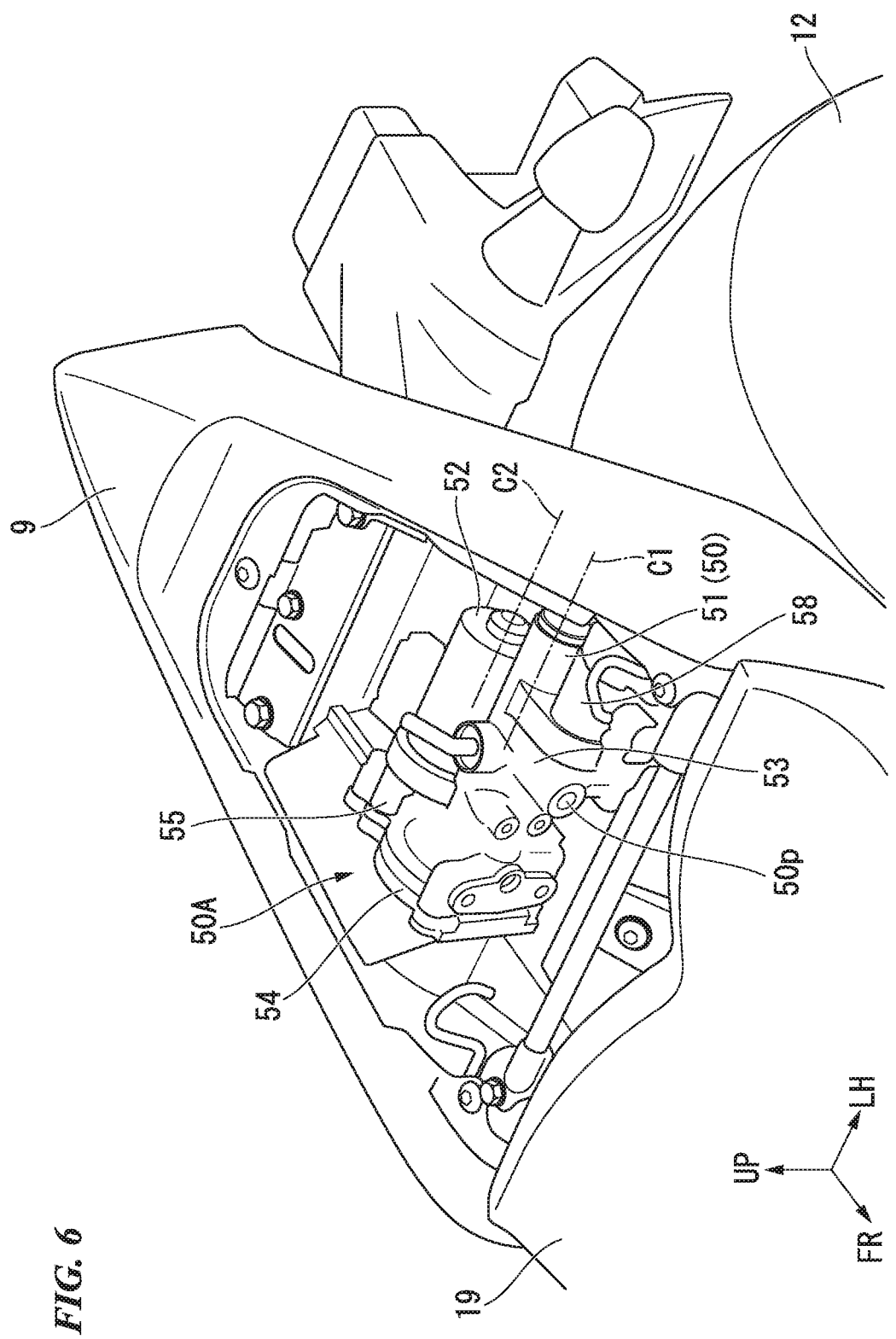
FIG. 6 is a perspective view showing a vehicle-mounted state of the clutch actuator.
Figure 7:
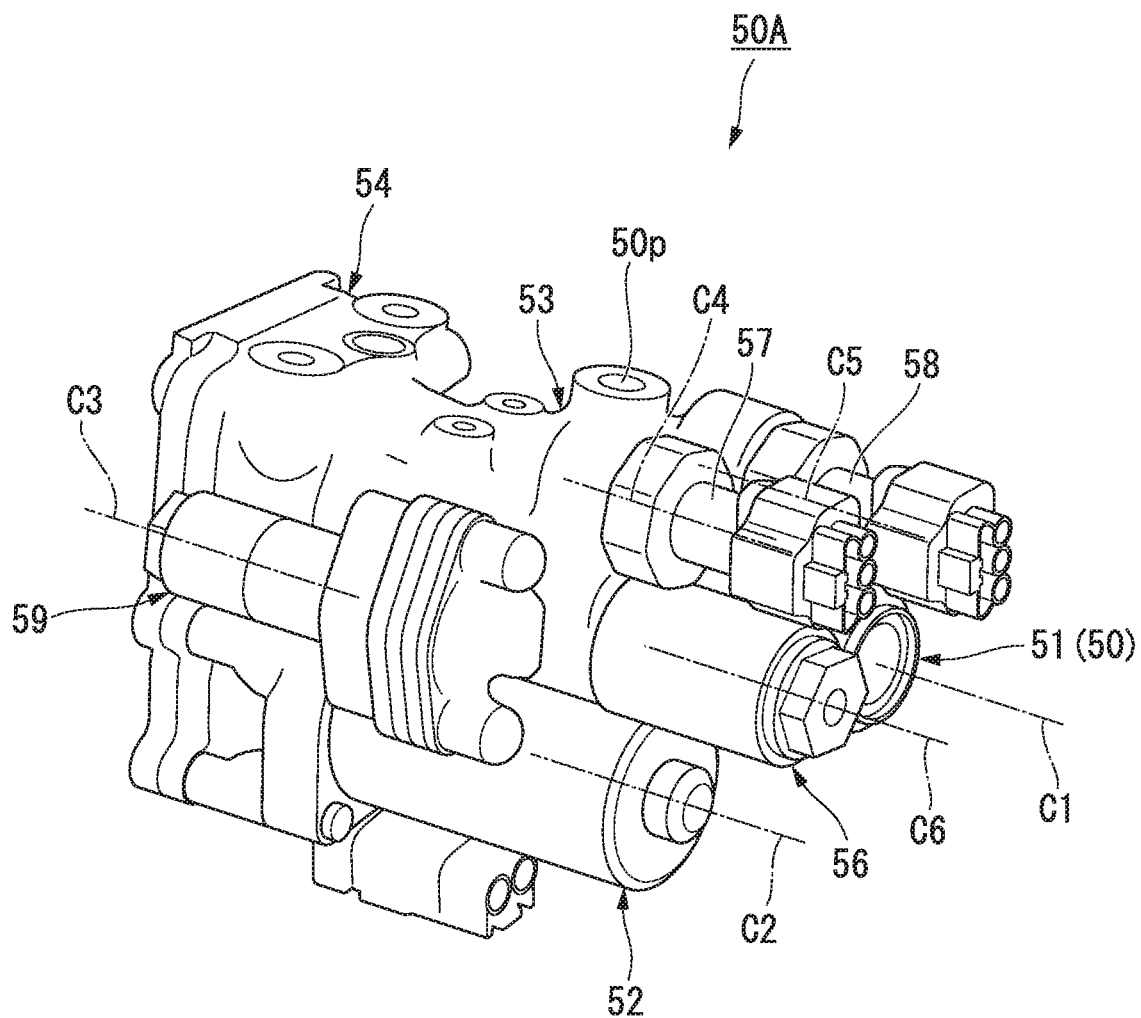
FIG. 7 is a perspective view of the clutch actuator.
Figure 8:
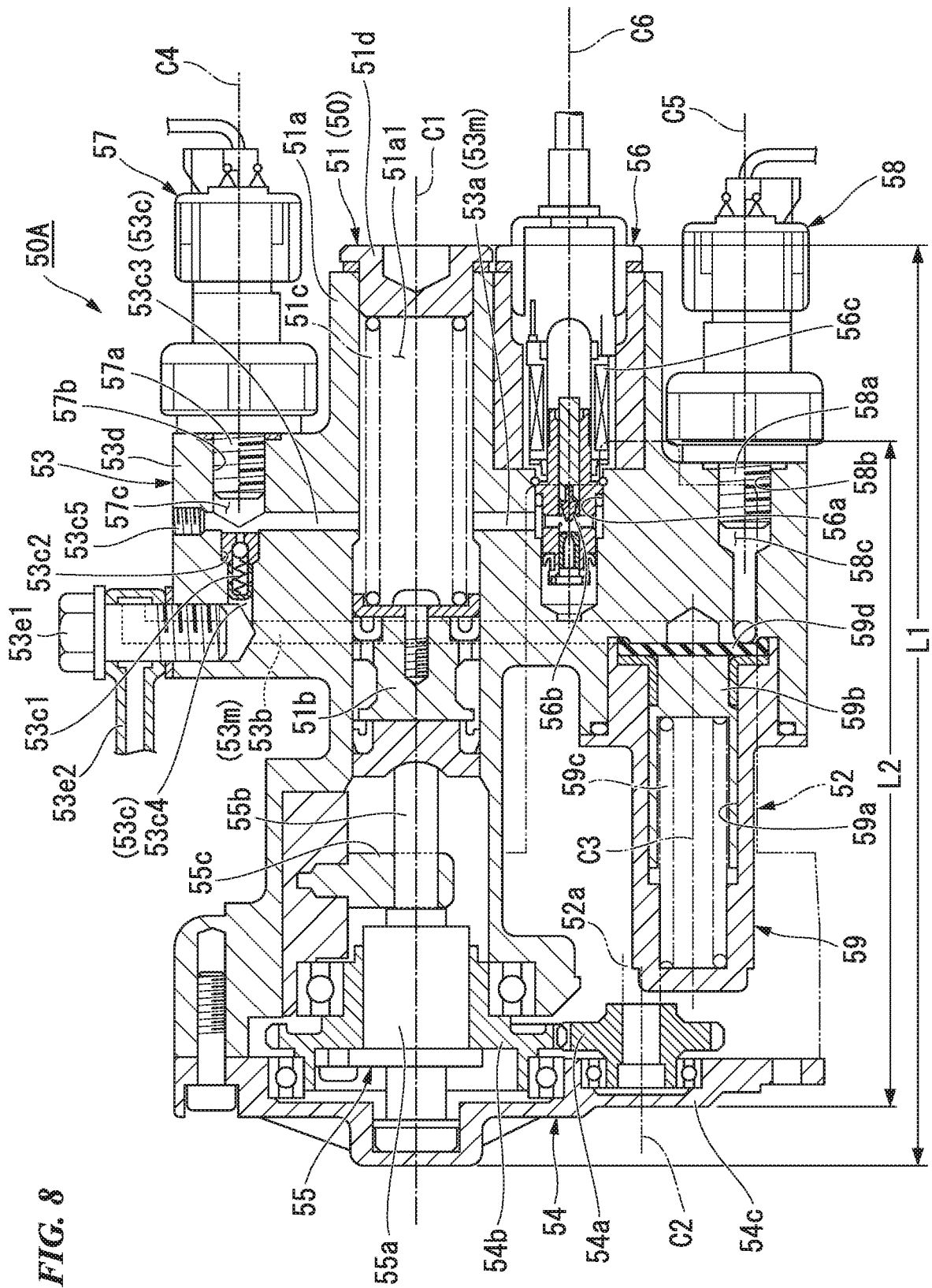
FIG. 8 is a cross-sectional exploded view of the clutch actuator.

As shown in FIG. 6 to FIG. 8, the clutch control unit 50A is formed by integrating the master cylinder 51 and the motor 52 of the clutch actuator 50, a transmission mechanism 54 and a conversion mechanism 55, and the hydraulic pressure circuit device 53 as a unit. Further, in FIG. 6, the rear seat cover 19a is removed.

The clutch actuator 50 is disposed such that an axial direction of a driving shaft 52a of the motor 52 is parallel to an axial direction of the master cylinder 51 (an axial direction of the cylinder main body 51a, a stroke direction of the piston 51b). A line C1 in the drawings represents a central axis of the master cylinder 51 in the axial direction, and a line C2 represents a central axis of the motor 52 in the axial direction. The clutch actuator 50 is mounted in a vehicle such that the axial direction of the motor 52 and the master cylinder 51 is along a vehicle width direction (a leftward/rightward direction).

Referring to FIG. 8, an overall length L1 in a disposition area of the master cylinder 51 in the axial direction is larger than an overall length L2 of a disposition area of the motor 52 in the axial direction. The disposition area of the motor 52 is disposed within the overall length L1 of the disposition area of the master cylinder 51 in the axial direction.

The driving shaft 52a of the motor 52 protrudes toward a left side of a main body including a stator and a rotor in the drawing. The conversion mechanism 55 serving as a ball screw mechanism is disposed coaxially with and adjacent to the master cylinder 51 on the left side of the drawing. The transmission mechanism 54 is installed to bridge the driving shaft 52a of the motor 52 and the conversion mechanism 55.

The transmission mechanism 54 includes a drive gear 54a having a relatively small diameter and coaxially attached to the driving shaft 52a of the motor 52, a driven gear 54b having a relatively large diameter and attached to a ball nut 55a of the conversion mechanism 55, and a cover member 54c that bridges the master cylinder 51 and an end portion of the motor 52 on the left side of the drawing. A gear case configured to rotatably accommodate both of the gears 54a and 54b is formed by end portions of the master cylinder 51 and the motor 52, and the cover member 54c.

The conversion mechanism 55 has the ball nut 55a having a cylindrical shape coaxial with the master cylinder 51, and a ball screw shaft 55b coaxially inserted through the ball nut 55a. The driven gear 54b is integrally rotatably attached to the ball nut 55a. The ball screw shaft 55b extends from the ball nut 55a toward a right side of the drawing, is supported in a state in which rotation thereof is restricted by a guide member 55c, and causes a tip portion thereof to abut a facing end portion of the piston 51b of the master cylinder 51.

The piston 51b of the master cylinder 51 is biased toward a left side of the drawing by a coil spring 51c in the cylinder main body 51a. While an end portion of the cylinder main body 51a on the right side of the drawing is open, the opening section is closed by screwing of an end cap 51d. The end cap 51d functions as a spring seat for a right end of the coil spring 51c. The end cap 51d is screwed and fixed to the opening section of the cylinder main body 51a after inserting the piston 51b and the coil spring 51c into the cylinder main body 51a from the opening section of the cylinder main body 51a. The end cap 51d closes the opening section of the cylinder main body 51a while compressing the coil spring 51c to apply an initial load.

Movement of the piston 51b in the cylinder main body 51a toward the left side of the drawing is restricted by the piston 51b abutting the ball screw shaft 55b. A space in the cylinder main body 51a on the right side of the piston 51b in the drawing is a hydraulic pressure chamber 51a1 in which a hydraulic pressure supplied to the slave cylinder 28 is generated. Further, miniaturization of the piston 51b can be achieved while a spring length is secured by forming a right side of the piston 51b in the drawing in a concave shape and causing the coil spring 51c to enter and be encapsulated therein.

When the motor 52 is driven, a rotary driving force is transmitted to the ball nut 55a via the transmission mechanism 54. The ball nut 55a converts the transmitted rotary driving force into a reciprocal driving force of the ball screw shaft 55b in the axial direction. The ball screw shaft 55b strokes toward the right side of the drawing during driving of the motor 52 and presses the piston 51b to supply a hydraulic pressure of the hydraulic pressure chamber 51a1 to the slave cylinder 28. The ball screw shaft 55b can stroke toward the left side of the drawing together with the piston 51b due to the biasing force of the coil spring 51c during stoppage of the motor 52, and can collect the hydraulic pressure supplied to the slave cylinder 28.

The hydraulic pressure circuit device 53 integrally forms an oil path forming block (a hydraulic pressure circuit component member) 53d at an outer circumference of the master cylinder 51.

The oil path forming block 53d has the upstream side oil path 53a extending from the hydraulic pressure chamber 51a1 of the master cylinder 51 toward one side of the outside in the radial direction (a lower side of the drawing), the downstream side oil path 53b extending in parallel to the upstream side oil path 53a, for example, on the side closer to the transmission mechanism 54 than the upstream side oil path 53a, and the bypass oil path 53c configured to bring an area of the downstream side oil path 53b on the side of the hydraulic pressure supply/discharge port 50p and the hydraulic pressure chamber 51a1 of the master cylinder 51 in communication with each other.

The oil path forming block 53d and the cylinder main body 51a of the master cylinder 51 are integrally formed with each other.

The solenoid valve 56 is disposed in the master cylinder 51 on a lower side of the drawing. The solenoid valve 56 includes a spool 56b that can stroke in a valve chamber 56a punched in the oil path forming block 53d, and a solenoid 56c fixed on the side of the valve chamber 56a and excited by supply of electric power to stroke the spool 56b.

When the spool 56b is at a non-operation position at which the spool 56b strokes to a right side of the drawing due to a biasing force of the return spring, the solenoid valve 56 is in an open state, and the upstream side oil path 53a and the downstream side oil path 53b are in a communication state. When the spool 56b is at an operation position at which the spool 56b strokes to a left side in the drawing due to an electromagnetic force of the solenoid 56c, the solenoid valve 56 is in a closed state, and the upstream side oil path 53a and the downstream side oil path 53b are in a blocked state.

The solenoid valve 56 is disposed such that a stroke direction (an axial direction) of the spool 56b is parallel to the axial direction of the master cylinder 51 and the motor 52. A line C6 in the drawing represents a central axis of the solenoid valve 56 in the axial direction.

The upstream side hydraulic pressure sensor 57 and the downstream side hydraulic pressure sensor 58 are attached to the oil path forming block 53d on the right side of the drawing. The upstream side hydraulic pressure sensor 57 and the downstream side hydraulic pressure sensor 58 are formed in rod shapes extending parallel to the axial directions of the master cylinder 51 and the motor 52, and hydraulic pressure sensing units 57a and 58a are screwed and attached to attachment holes 57b and 58b punched in the oil path forming block 53d. The upstream side hydraulic pressure sensor 57 and the downstream side hydraulic pressure sensor 58 are attached from the same side (right side in the drawing) in the axial direction.

The sensing unit 57a of the upstream side hydraulic pressure sensor 57 faces an upstream side sensing chamber 57c communicating with a upstream bypass oil path 53c3 of the bypass oil path 53c which will be described later, and the sensing unit 58a of the downstream side hydraulic pressure sensor 58 faces a downstream side sensing chamber 58c communicating with the downstream side oil path 53b. Further, the sensing unit 57a of the upstream side hydraulic pressure sensor 57 may face the sensing chamber communicating with the upstream side oil path 53a.

The upstream side hydraulic pressure sensor 57 and the downstream side hydraulic pressure sensor 58 are disposed such that the respective extending directions (axial directions) are parallel to the axial directions of the master cylinder 51 and the motor 52. The upstream side hydraulic pressure sensor 57 and the downstream side hydraulic pressure sensor 58 are both constituted using a single type of sensor. Reference numerals C4 and C5 in the drawings represent center axes in the axial direction of the upstream side hydraulic pressure sensor 57 and the downstream side hydraulic pressure sensor 58, respectively.

The accumulator 59 is attached to the oil path forming block 53d on the left side of the drawing. The accumulator 59 includes a piston 59b slidably fitted into an accumulator chamber 59a, a coil spring 59c configured to bias the piston 59b from the accumulator chamber 59a in a pressing-out direction, and a diaphragm 59d configured to separate the accumulator chamber 59a and the downstream side oil path 53b. The diaphragm 59d faces the downstream side oil path 53b. In the accumulator 59, when a hydraulic pressure of the downstream side oil path 53b is increased, the piston 59b is pressed against a biasing force of the coil spring 59c via the diaphragm 59d, and the hydraulic pressure is accumulated in the accumulator chamber 59a. After that, when the hydraulic pressure in the downstream side oil path 53b is decreased, the accumulated hydraulic pressure is discharged and a variation in pressure in the downstream side oil path 53b is suppressed.

The accumulator chamber 59a is formed integrally in a bottomed cylindrical shape, and reduction in size, weight and cost is achieved in comparison with a configuration in which a bottom section is formed by attaching a separate spring set bolt thereto.

The accumulator 59 is disposed such that a stroke direction (an axial direction) of the piston 59b is parallel to the axial directions of the master cylinder 51 and the motor 52. A line C3 in the drawing represents a central axis of the accumulator 59 in the axial direction.

An area of the bypass oil path 53c closer to the hydraulic pressure chamber 51a1 than the one way valve 53c1 (an area in communication with the hydraulic pressure chamber 51a1, hereinafter referred to as the upstream bypass oil path 53c3) is linearly arranged with the upstream side oil path 53a with the master cylinder 51 sandwiched therebetween. The upstream side oil path 53a and the upstream bypass oil path 53c3 have, for example, the same diameter, and may be formed by punching from one direction. Reference numeral 53c5 represents a seal plug configured to close an opening section of the upstream bypass oil path 53c3 outside the block.

An area of the bypass oil path 53c including a valve chamber 53c2 that accommodates the one way valve 53c1 (an area closer to the hydraulic pressure supply/discharge port 50p than the upstream bypass oil path 53c3, hereinafter referred to as a downstream bypass oil path 53c4) is formed to be perpendicular to the upstream bypass oil path 53c3. The downstream bypass oil path 53c4 is formed coaxially with an attachment hole 57b in an extension direction of the upstream side hydraulic pressure sensor 57. The attachment hole 57b is formed to have a diameter larger than that of the downstream bypass oil path 53c4 and that increases stepwise from the downstream bypass oil path 53c4 to the attachment hole 57b. For this reason, the downstream bypass oil path 53c4 and the attachment hole 57b may be formed by punching stepwise from one direction. An opening section of the attachment hole 57b outside the oil path forming block 53d is closed by attaching the upstream side hydraulic pressure sensor 57 thereto, and can allow elimination of the seal plug that closes the upstream bypass oil path 53c3 (the valve chamber 53c2).

The downstream side oil path 53b is punched from an upper end to a lower end of the oil path forming block 53d in the drawing. The upper end of the downstream side oil path 53b in the drawing is the hydraulic pressure supply/discharge port 50p into which a banjo bolt 53e1 is screwed coaxially. A banjo joint 53e2 of an end portion of the hydraulic pressure pipeline 53e is attached to the hydraulic pressure supply/discharge port 50p via the banjo bolt 53e1.

An opening section of an upper end of the downstream side oil path 53b in the drawing is closed by attaching the hydraulic pressure pipeline 53e thereto and can allow elimination of the seal plug that closes the downstream side oil path 53b.

Next, feedback control of the clutch actuator 50 will be described.

Referring to FIG. 4, the ECU 60 performs the feedback control (PID control (PID: Proportional-Integral-Differential Controller)) of the clutch actuator 50, on the basis of the hydraulic pressure detection information measured by the upstream side hydraulic pressure sensor 57 and the downstream side hydraulic pressure sensor 58. In the feedback control, the feedback control amount is calculated on the basis of the deviation between a target hydraulic pressure and an actual hydraulic pressure.

In the feedback control block 60a of the ECU 60, the feedback control amount for the motor 52 of the clutch actuator 50 is calculated on the basis of the deviation between the target hydraulic pressure and the actual hydraulic pressure on the clutch device 26 side. In the motor control block 60b of the ECU 60, drive control (for example, PWM control (PWM: Pulse Width Modulation)) of the motor 52 of the clutch actuator 50 is performed on the basis of the calculated feedback control amount. In the motor control block 60b, a PWM drive command signal for the motor 52 is generated in accordance with the target hydraulic pressure (hydraulic pressure deviation). As a result, the feedback control of the clutch actuator 50 is performed so that the actual hydraulic pressure follows the target hydraulic pressure.

When the hydraulic pressure is supplied and discharged between the clutch actuator 50 and the clutch device 26, even if the solenoid valve 56 is in the valve open state, a pressure difference occurs between the clutch actuator 50 side and the clutch device 26 side due to the pressure loss in the hydraulic pressure circuit device 53. In particular, in the solenoid valve 56, since there is a throttle of the oil path and the like, a pressure difference is likely to occur between the upstream side of the solenoid valve 56 and the downstream side of the solenoid valve 56. Therefore, at the time of the pressurization control for supplying the hydraulic pressure from the clutch actuator 50 to the clutch device 26 and the depressurization control for returning the hydraulic pressure from the clutch device 26 to the clutch actuator 50, a difference occurs in the hydraulic pressure behavior between the upstream side of the solenoid valve 56 (the clutch actuator 50 side) and the downstream side of the solenoid valve 56 (the clutch device 26 side).

That is, even if the solenoid valve 56 is in the valve open state, when the clutch actuator 50 is driven to supply the hydraulic pressure to the clutch device 26 side, the hydraulic pressure fluctuation of the clutch device 26 side occurs later than the hydraulic pressure fluctuation of the clutch actuator 50 side. In this case, the hydraulic pressure on the clutch device 26 side becomes lower than the hydraulic pressure on the clutch actuator 50 side. At this time, if the clutch actuator 50 is driven and controlled on the basis of the detection information of the upstream side hydraulic pressure sensor 57 on the clutch actuator 50 side, when the clutch device 26 is engaged, the hydraulic pressure on clutch actuator 50 side overshoots to a higher side (the fluctuation of the hydraulic pressure state (waveform) increases). Therefore, the time taken until completion of the feedback control becomes longer, and it is difficult to ensure the responsiveness at the time of connection of the clutch device 26 (clutch ineffective filling region). That is, it is difficult to shorten the time taken until completion of the feedback control.

Figure 9:
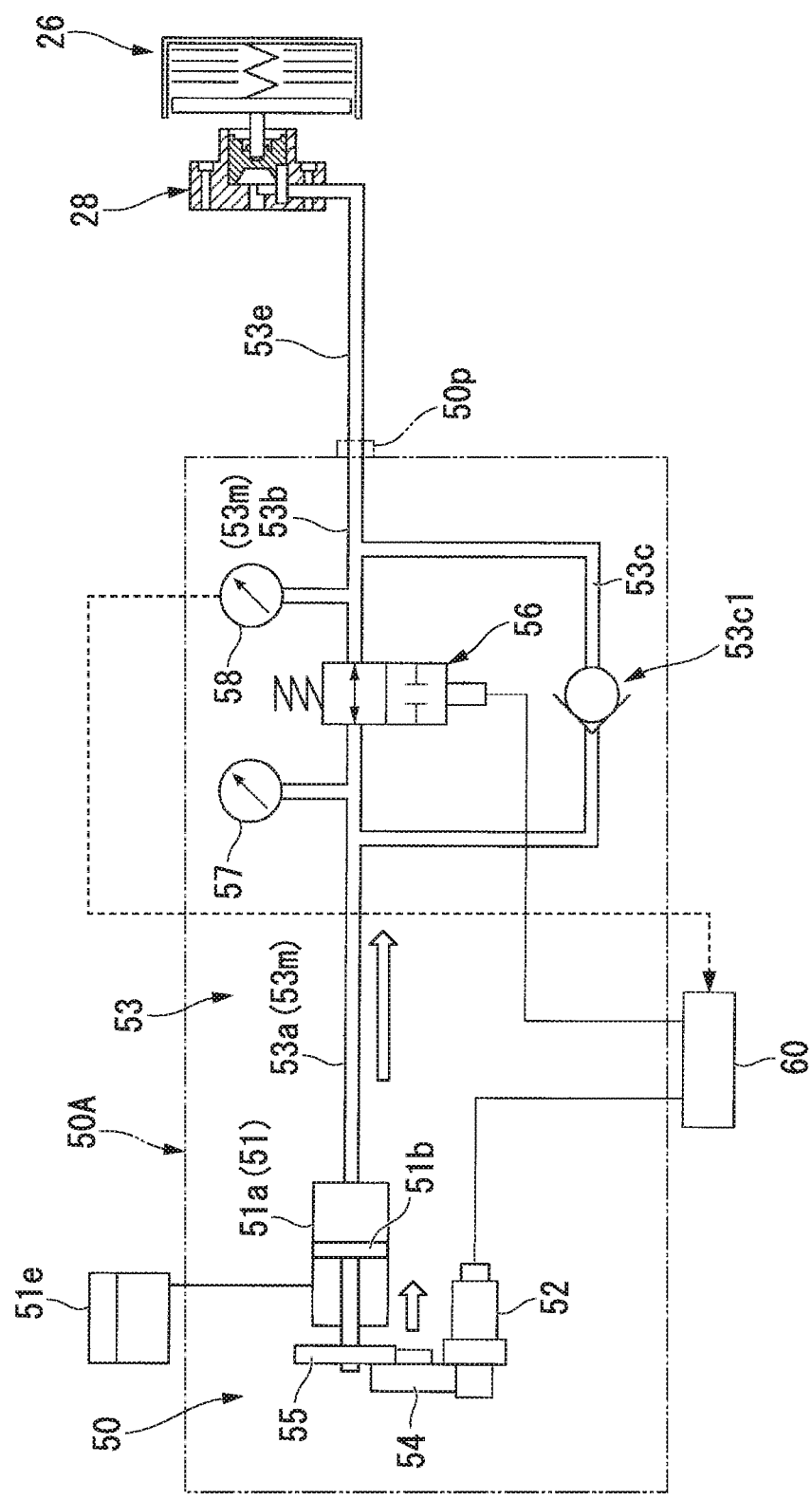
FIG. 9 is an explanatory view corresponding to FIG. 3 showing a first action of an embodiment of the present invention.

In contrast, in the embodiment of the present invention, as shown in FIG. 9, when control (pressurization control) of pressurizing the hydraulic pressure of the slave cylinder 28 to the clutch engagement hydraulic pressure is performed, the clutch actuator 50 is driven and controlled on the basis of the detection information of the downstream side hydraulic pressure sensor 58 on the clutch device 26 side. That is, the clutch actuator 50 is driven and controlled on the basis of the detection information of the side on which the fluctuation of the hydraulic pressure state is small, among both hydraulic pressure sensors 57 and 58. As a result, responsiveness at the time of connection of the clutch device 26 is easily ensured, and it is possible to shorten the time taken until completion of the feedback control.

On the other hand, when the gear shifting is performed just after filling the clutch device 26 with hydraulic pressure, the clutch actuator 50 is driven in reverse rotation while the solenoid valve 56 remains in the valve open state, the master cylinder 51 and the reservoir 51e are caused to communicate with each other, and the hydraulic pressure on the clutch device 26 side is returned to the master cylinder 51 side. Even in this case, a hydraulic pressure fluctuation on the clutch device 26 side occurs later than the hydraulic pressure fluctuation on the clutch actuator 50 side. However, in contrast to the pressurization control time, the hydraulic pressure on the clutch device 26 side becomes higher than the hydraulic pressure on the clutch actuator 50 side. At this time, if the clutch actuator 50 is driven and controlled on the basis of the detection information of the downstream side hydraulic pressure sensor 58 on the clutch device 26 side, when the clutch device 26 is released, the hydraulic pressure on the clutch device 26 side overshoots to the lower side (the fluctuation of the hydraulic pressure state increases). For this reason, the time taken until completion of the feedback control becomes longer, and it is difficult to secure responsiveness at the time of releasing the clutch device 26 (clutch capacity control region).

Figure 10:
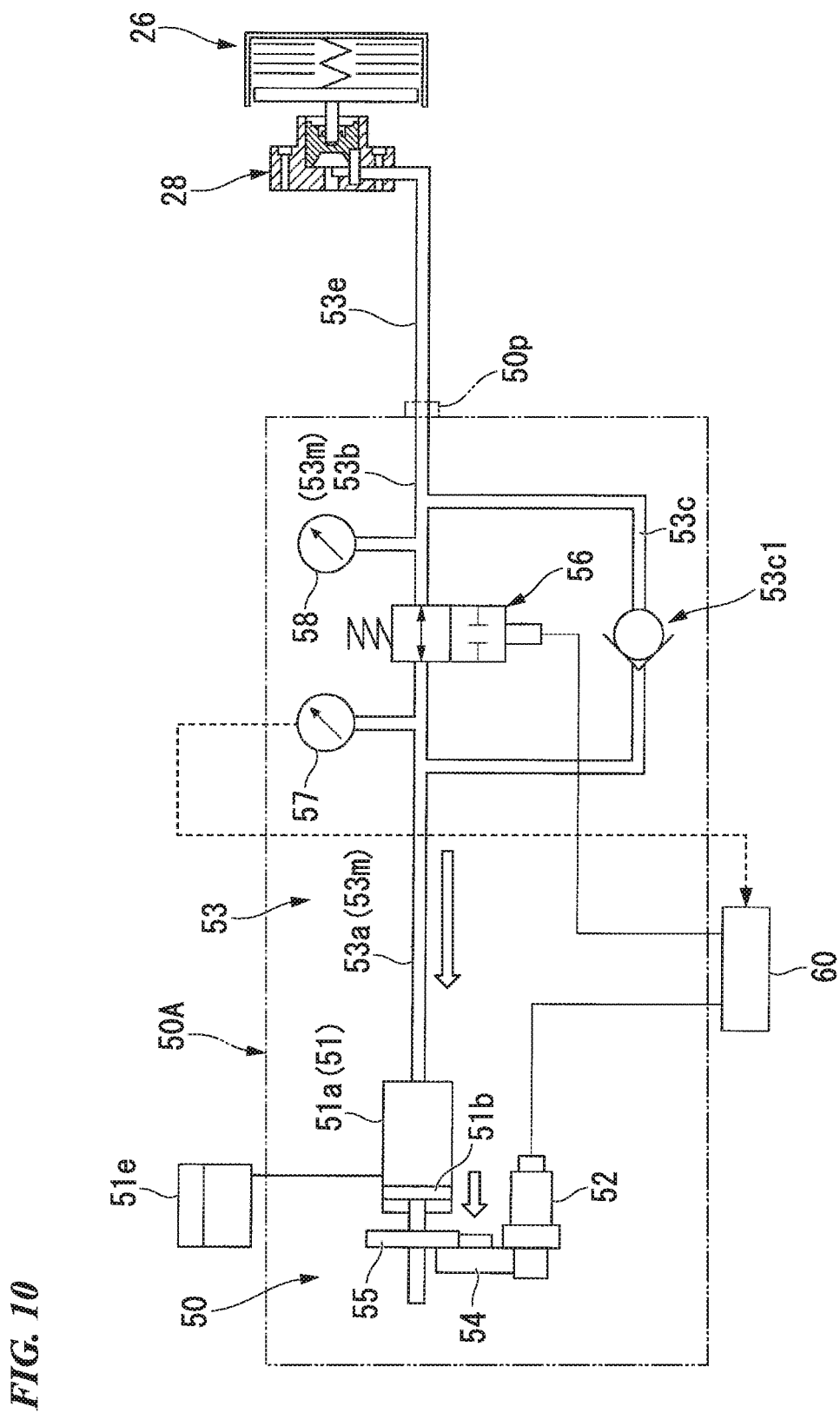
FIG. 10 is an explanatory view corresponding to FIG. 3 showing a second action of the embodiment of the present invention.

In contrast, in the embodiment of the present invention, as shown in FIG. 10, when control (depressurization control) of adjusting the hydraulic pressure of the slave cylinder 28 to the clutch release hydraulic pressure is performed, the clutch actuator 50 is driven and controlled on the basis of the detection information of the upstream side hydraulic pressure sensor 57 of the clutch actuator 50 side. That is, the clutch actuator 50 is driven and controlled on the basis of the detection information of the side on which the fluctuation of the hydraulic pressure state is small, among both hydraulic pressure sensors 57 and 58. This makes it easier to secure responsiveness at the time of release of the clutch device 26, and it is possible to shorten the time taken until completion of the feedback control.

Figure 11:
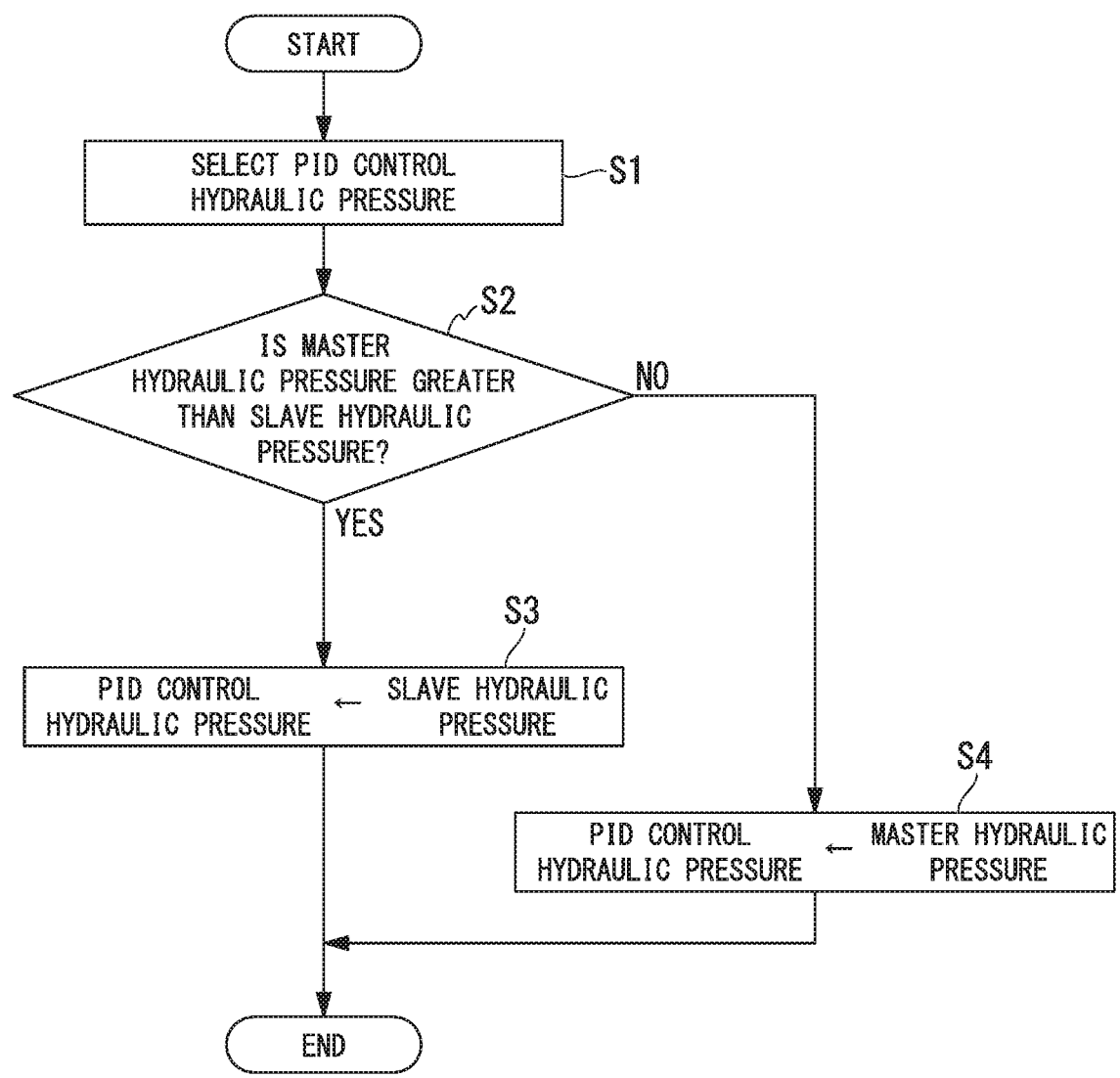
FIG. 11 is a flowchart schematically showing the control of the clutch actuator.

Next, an example of a process performed by the ECU 60 will be described with reference to the flowchart of FIG. 11. The control flow shown in FIG. 11 is repeatedly executed at a predetermined control cycle when the power supply is turned ON (the main switch is turned ON).

First, the ECU 60 selects which detection information of both hydraulic pressure sensors 57 and 58 to use as the hydraulic pressure value used for PID control (step S1). Specifically, in step S2, it is determined whether or not the hydraulic pressure (master hydraulic pressure) of the master cylinder 51 side is higher than the hydraulic pressure of the slave cylinder 28 side (slave hydraulic pressure). This determination corresponds to a determination as to whether or not the hydraulic pressure fluctuation on the upstream side is greater than the hydraulic pressure fluctuation on the downstream side.

In step S2, when it is determined that the hydraulic pressure on the master cylinder 51 side is higher than the hydraulic pressure on the slave cylinder 28 side (YES in step S2), the detection information of the downstream side hydraulic pressure sensor 58 is selected as the hydraulic pressure value used for PID control (Step S3). Thus, when the clutch hydraulic pressure rises, the clutch actuator 50 can be driven and controlled on the basis of the detection information of the downstream side on which fluctuation of the hydraulic pressure state is small.

In step S2, when it is determined that the hydraulic pressure on the master cylinder 51 side is equal to or lower than the hydraulic pressure on the slave cylinder 28 side (NO in step S2), the detection information of the upstream side hydraulic pressure sensor 57 is selected as the hydraulic pressure value used for the PID control (step S4). Thus, when the clutch hydraulic pressure is reduced, it is possible to drive and control the clutch actuator 50 on the basis of the detection information of the upstream side on which fluctuation of the hydraulic pressure state is small.

As described above, in the above embodiment, in the clutch control device which has the solenoid valve 56 in the hydraulic pressure circuit device 53 between the clutch device 26 and the clutch actuator 50, and performs the feedback control of the clutch actuator 50 on the basis of the detection information of the hydraulic pressure sensors 57 and 58, the hydraulic pressure information of the side on which fluctuation in hydraulic pressure is small (the side on which the fluctuation is delayed) was used, among the hydraulic pressure detection information of both hydraulic pressure sensors 57 and 58 provided upstream and downstream of the solenoid valve 56, at the time of pressurization control and the time of depressurization control of the clutch actuator 50.

That is, when hydraulic pressure is supplied and discharged between the clutch actuator 50 and the clutch device 26, due to the pressure loss in the hydraulic pressure circuit device 53 (particularly, the pressure loss when passing through the solenoid valve 56), the pressure difference occurs between the clutch actuator 50 side and the clutch device 26 side. For this reason, the hydraulic pressure behavior varies with the solenoid valve 56 as a boundary between the pressurization control time for supplying the hydraulic pressure from the clutch actuator 50 to the clutch device 26 and the depressurization control time for returning the hydraulic pressure from the clutch device 26 to the clutch actuator 50. That is, a difference occurs in hydraulic pressure behavior between the upstream side (the clutch actuator 50 side) of the solenoid valve 56 and the downstream side (the clutch device 26 side) of the solenoid valve 56.

In consideration of the difference in the hydraulic pressure behavior, by utilizing the hydraulic pressure detection information of the side on which the fluctuation of the hydraulic pressure is small among the hydraulic pressure detection information of the upstream side hydraulic pressure sensor 57 and the downstream side hydraulic pressure sensor 58, shortening of the time taken until completion of the feedback control is promoted, and quick hydraulic pressure clutch control can be performed.

Further, in the aforementioned embodiment, when the clutch actuator 50 is driven to the pressurization side, the ECU 60 performs the feedback control of the clutch actuator 50 using the hydraulic pressure detection information of the downstream side hydraulic pressure sensor 58. When the clutch actuator 50 is driven to the depressurization side, the ECU 60 performs the feedback control of the clutch actuator 50 using the hydraulic pressure detection information of the upstream side hydraulic pressure sensor 57.

As a result, even when a difference occurs in hydraulic pressure behavior between the upstream side and the downstream side via the solenoid valve 56 due to the influence of resistance when the working fluid flows through the solenoid valve 56 at the time of pressurization and depressurization, it is possible to control the clutch actuator 50 using the hydraulic pressure detection information of the side on which the hydraulic pressure fluctuation is small. For this reason, it is possible to shorten the time taken until completion of the feedback control.

Further, in the aforementioned embodiment, the ECU 60 performs the feedback control of the clutch actuator 50 using the hydraulic pressure detection information on the side with the low detection value, among the hydraulic pressure detection information on the upstream side hydraulic pressure sensor 57 and the downstream side hydraulic pressure sensor 58.

As a result, when the hydraulic pressure value used for the feedback control of the clutch actuator 50 is switched, the hydraulic pressure detection information on the side with low detection value in both hydraulic pressure sensors 57 and 58 is selected. At the time of pressurization and depressurization, the side on which the hydraulic pressure detection value decreases under the influence of the resistance of the solenoid valve 56 is a side on which the fluctuation in the hydraulic pressure is small. By utilizing this feature, it is possible to shorten the time taken until the completion of the feedback control, while performing simple control of selecting the hydraulic pressure information on the side with a lower detected value, among the hydraulic pressure detection information of both of the hydraulic pressure sensors 57 and 58.

Further, in the aforementioned embodiment, a single type of sensor is used as both of the upstream side hydraulic pressure sensor 57 and the downstream side hydraulic pressure sensor 58.

Accordingly, the features of the output values of the upstream side hydraulic pressure sensor 57 and the downstream side hydraulic pressure sensor 58 can be made identical. Therefore, it is unnecessary to convert the output of the upstream side hydraulic pressure sensor 57 and the downstream side hydraulic pressure sensor 58, and it is possible to suppress an increase in the load of control calculation.

Further, in the aforementioned embodiment, the upstream side hydraulic pressure sensor 57 and the downstream side hydraulic pressure sensor 58 are attached to the oil path forming block 53*d* of the hydraulic pressure circuit device 53.

As a result, the plurality of hydraulic pressure sensors 57 and 58 are attached to the oil path forming block 53*d* of the hydraulic pressure circuit device 53 together with the solenoid valve 56 to integrally form a unit, and the upstream side hydraulic pressure sensor 57 and the downstream side hydraulic pressure sensor 58 can be disposed close to the solenoid valve 56. Therefore, it is possible to equalize the hydraulic pressure detection conditions (the distance to the solenoid valve 56 or the like) of the upstream side hydraulic pressure sensor 57 and the downstream side hydraulic pressure sensor 58, and to reduce the difference in detection accuracy.

Further, in the aforementioned embodiment, the upstream side hydraulic pressure sensor 57 and the downstream side hydraulic pressure sensor 58 are arranged such that their axial directions coincide with each other in the same direction, and are both attached to the oil path forming block 53*d* from the same side in the axial direction.

Thus, the axial directions of the upstream side hydraulic pressure sensor 57 and the downstream side hydraulic pressure sensor 58 can be made to coincide with each other in the same direction, and it is possible for the upstream side hydraulic pressure sensor 57 and the downstream side hydraulic pressure sensor 58 to be disposed with the direction in which they are attached to the oil path forming block 53*d* aligned in the axial direction. Therefore, the plurality of hydraulic pressure sensors 57 and 58 are compactly disposed, attachment and detachment of the plurality of hydraulic pressure sensors 57 and 58 are facilitated, and it is possible to easily facilitate the handling of the harness connected to the plurality of hydraulic pressure sensors 57 and 58.

Further, in the aforementioned embodiment, the oil path forming block 53*d* has the valve chamber 56*a* of the solenoid valve 56, an upstream side sensing chamber 57*c* and a downstream side sensing chamber 58*c* in which the sensing units 57*a* and 58*a* of the upstream side hydraulic pressure sensor 57 and the downstream side hydraulic pressure sensor 58 face, respectively, and oil paths 53*a* and 53*b* through which the valve chamber 56*a*, the upstream side sensing chamber 57*c*, and the downstream side sensing chamber 58*c* communicate with each other.

Accordingly, it is possible to easily integrate the hydraulic pressure circuit device 53 which includes the solenoid valve 56, the upstream side hydraulic pressure sensor 57, and the downstream side hydraulic pressure sensor 58.

Further, in the aforementioned embodiment, the clutch actuator 50 has the master cylinder 51 as the hydraulic pressure generating device, and the cylinder main body 51*a* of the master cylinder 51 is integrally formed with the oil path forming block 53*d*.

Accordingly, it is possible to easily configure the integrated clutch control unit 50A which includes the solenoid valve 56, the upstream side hydraulic pressure sensor 57, the downstream side hydraulic pressure sensor 58, and the master cylinder 51.

Further, the present invention is not limited to the aforementioned embodiment, and for example, the ECU 60 may be integrally provided in the clutch actuator 50. It may be combined with a clutch device which is brought into a disengaged state by supply of hydraulic pressure from the master cylinder 51.

The hydraulic pressure sensors 57 and 58 may not be integrally attached to the hydraulic pressure circuit device 53. For example, it is also possible to provide sensors or the like as a sensor unit device separate from the hydraulic pressure circuit device 53 in the middle of the hydraulic pressure circuit.

The present invention is not limited to application to a motorcycle but may be applied to a three-wheel vehicle (including a two-front-wheel and one-rear-wheel vehicle in addition to a one-front-wheel and two-rear-wheel vehicle) or a four-wheel vehicle.

Moreover, the configuration in the above embodiment is an example of the present invention, and various modifications are possible without departing from the gist of the present invention, such as replacing the constituent elements of the embodiment with well-known constituent elements.

What is claimed is:

1. A clutch control device comprising:
a clutch device which is configured to connect and disconnect power transmission using hydraulic pressure;
a clutch actuator which is configured to generate the hydraulic pressure supplied to the clutch device;
a hydraulic pressure circuit device which is configured to connect the clutch device and the clutch actuator;
a hydraulic pressure sensor which is configured to detect the hydraulic pressure in the hydraulic pressure circuit device; and
a control device which is configured to control the clutch actuator in accordance with the hydraulic pressure in the hydraulic pressure circuit device,
wherein a control valve is provided in a hydraulic pressure supply and discharge oil path between the clutch device and the clutch actuator in the hydraulic pressure circuit device, and is configured to control a flow of a working fluid between the clutch device and the clutch actuator by closing or opening the hydraulic pressure supply and the discharge oil path,
the hydraulic pressure sensor includes an upstream side hydraulic pressure sensor and a downstream side hydraulic pressure sensor provided upstream and downstream of the control valve, respectively,
the control device is configured to perform feedback control of the clutch actuator using hydraulic pressure detection information of either the upstream side hydraulic pressure sensor or the downstream side hydraulic pressure sensor of the control valve on which hydraulic pressure fluctuation is smaller, among the hydraulic pressure detection information of each of the upstream side hydraulic pressure sensor and the downstream side hydraulic pressure sensor, in a case of driving the clutch actuator toward a pressurization side and in a case of driving the clutch actuator to a decompression side,
in the control device, a feedback control amount for a motor of the clutch actuator is calculated on a basis of a deviation between a target hydraulic pressure and an actual hydraulic pressure on the clutch device side,
drive control of the clutch actuator is performed on a basis of the calculated feedback control amount, and
control is performed so that the actual hydraulic pressure follows the target hydraulic pressure in accordance with the target hydraulic pressure.

2. The clutch control device according to claim 1, wherein the control device is configured to perform the feedback control of the clutch actuator using the hydraulic pressure detection information of the downstream side hydraulic pressure sensor in the case of driving the clutch actuator to the pressurization side, and the control device is configured to perform the feedback control of the clutch actuator using the hydraulic pressure detection information of the upstream side hydraulic pressure sensor in the case of driving the clutch actuator to the decompression side.

3. The clutch control device according to claim 2, wherein the control device is configured to perform the feedback control of the clutch actuator using the hydraulic pressure detection information of either the upstream side hydraulic pressure sensor or the downstream side hydraulic pressure sensor of the control valve with a lower detection value, among the hydraulic pressure detection information of each of the upstream side hydraulic pressure sensor and the downstream side hydraulic pressure sensor.

4. The clutch control device according to claim 1, wherein a single type of sensor is used as both of the upstream side hydraulic pressure sensor and the downstream side hydraulic pressure sensor.

5. The clutch control device according to claim 1, wherein the upstream side hydraulic pressure sensor and the downstream side hydraulic pressure sensor are attached to a hydraulic pressure circuit component member of the hydraulic pressure circuit device.

6. The clutch control device according to claim 5, wherein the upstream side hydraulic pressure sensor and the downstream side hydraulic pressure sensor are axially aligned in a same axial direction and are attached to the hydraulic pressure circuit component member on a same side in the axial direction.

7. The clutch control device according to claim 5, wherein the hydraulic pressure circuit component member has a valve chamber of the control valve, an upstream side sensing chamber and a downstream side sensing chamber which face sensing units of the upstream side hydraulic pressure sensor and the downstream side hydraulic pressure sensor, respectively, and an oil path through which the valve chamber, the upstream side sensing chamber, and the downstream side sensing chamber communicate with each other.

8. The clutch control device according to claim 5, wherein the clutch actuator has a master cylinder as a hydraulic pressure generating device, and a cylinder main body of the master cylinder is integrated with the hydraulic pressure circuit component member.

* * * * *